United States Patent [19]

Hooper et al.

[11] 4,228,915
[45] Oct. 21, 1980

[54] FUEL CAP WITH ANTIROTATION FEATURE BETWEEN COVER AND SKIRT PORTIONS

[75] Inventors: Robert E. Hooper; Lawrence P. Johnson, both of Huron, Ohio

[73] Assignee: General Motors Corporation, Detroit, Mich.

[21] Appl. No.: 38,633

[22] Filed: May 14, 1979

[51] Int. Cl.³ .............................................. B65D 41/04
[52] U.S. Cl. ................................. 220/288; 220/304; 220/DIG. 33
[58] Field of Search ............... 220/203, 303, 288, 304, 220/306, DIG. 33

[56] References Cited

U.S. PATENT DOCUMENTS

| | | |
|---|---|---|
| 3,209,963 | 10/1965 | Krieps et al. ................ 220/306 X |
| 3,464,582 | 9/1969 | Greitzer et al. ................ 220/306 |
| 4,065,026 | 12/1977 | Williams et al. ................ 220/304 |
| 4,091,955 | 5/1978 | Sloan, Jr. ................ 220/203 |

Primary Examiner—Allan N. Shoap
Attorney, Agent, or Firm—Donald F. Scherer

[57] ABSTRACT

A snap together fuel cap wherein a closure member is maintained between a cover portion and a skirt portion. The cover and skirt portions are secured together through cooperating axially facing surfaces formed on locking tab members. The tabs on the skirt have a predetermined width which is slightly less than the distance between adjacent protruding surfaces formed on the cover such that after assembly, the end walls on the skirt tabs will engage the edges of the protruding surfaces to limit relative rotation between the cover portion and the skirt portion.

1 Claim, 3 Drawing Figures

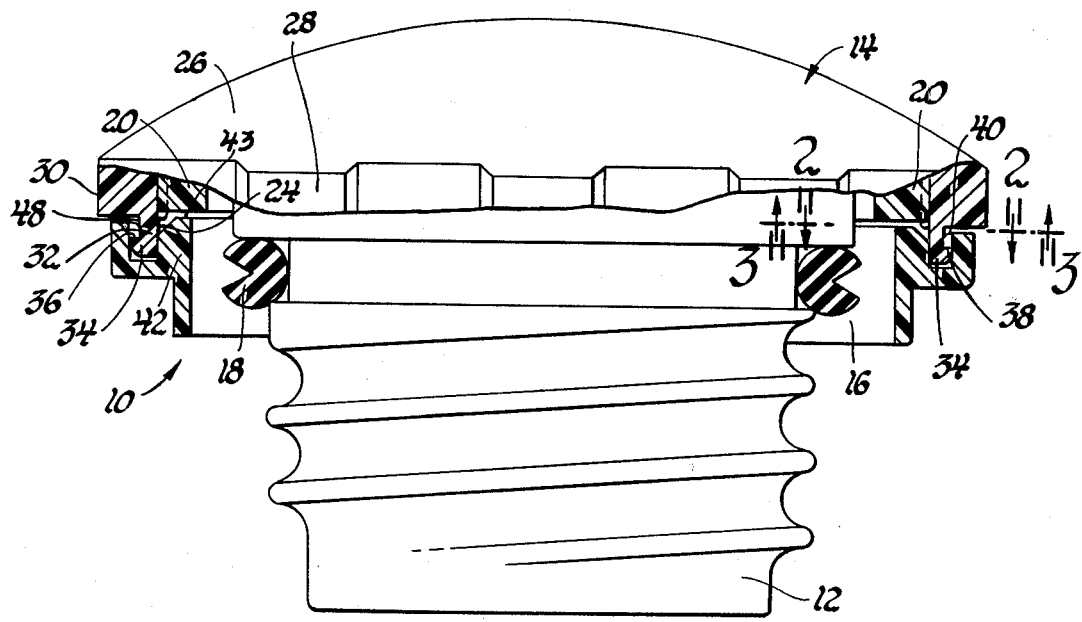
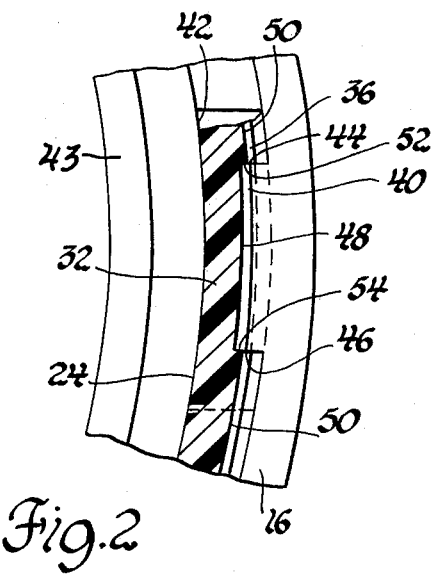
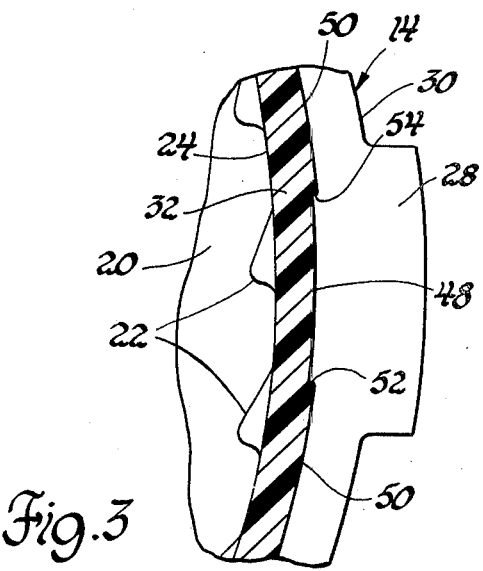

FUEL CAP WITH ANTIROTATION FEATURE BETWEEN COVER AND SKIRT PORTIONS

This invention relates to closures and more particularly to fuel caps having a plurality of structural components.

It is an object of this invention to provide an improved snap together plastic fuel cap assembly having a cover portion and a skirt portion wherein cooperating means formed on the cover and skirt portions limit the relative rotation therebetween.

It is another object of this invention to provide an improved snap together fuel cap assembly wherein a closure portion is axially restrained between a cover and skirt which snap together and wherein the skirt has a plurality of radially extending locking tabs which secure the skirt and cover in an axial direction and also have end walls engaging radially protruding surfaces on the cover to limit the relative rotation between the cover and skirt.

These and other objects and advantages of the present invention will be more apparent from the following description and drawings in which:

FIG. 1 is a view partly in section of a fuel cap assembly;

FIG. 2 is a view taken along line 2—2 of FIG. 1; and

FIG. 3 is a view taken along line 3—3 of FIG. 1.

Referring to the drawings, wherein like characters represent the same or corresponding parts throughout the several views, there is seen in FIG. 1, a fuel cap generally designated 10, having a threaded closure portion 12 axially positioned between a handle 14 and a skirt 16. The threaded closure 12 is adapted to be threadably engaged in a fuel filler tube. A V-grooved O-ring 18 cooperates with the closure 12 and seals against the upper portion of the fill tube. A more complete operation and description of the O-ring 18 can be found in U.S. Pat. No. 4,065,026 to Williams et al, issued Dec. 27, 1977.

The closure member 12 also houses a valve assembly, not shown, but which may be constructed in accordance with the valve assembly shown in U.S. Pat. No. 3,937,358 issued to Smith et al on Feb. 10, 1976, and assigned to the assignee of the present application. As is also well-known in the art, the closure member 12 is drivingly connected to the handle 14 through a plurality of torque arms such as 20, which are adapted to engage cam surfaces 22 formed on an inner surface 24 of the handle 14 and permit relative rotation between handle 14 and closure 12, such that limited torque may be applied to the closure 12 in one direction of rotation.

The handle 14 includes a generally domeshaped cover portion 26, a plurality of gripping protuberances 28 which extend radially from a cylindrical wall 30 of the cover portion 26. Extending axially from the cover portion 26 is a cylindrical wall 32 which has formed on the distal end thereof an annular locking tab 34. The annular locking tab 34 has an axially facing surface 36 adapted to mate with an axially facing surface 38 formed on each of a plurality of tab members 40 which are integral with the skirt 16. The skirt 16 has an inner cylindrical wall 42 which abuts the inner surface 24 of cylindrical wall 32 when the cap is assembled. The wall 42 has an annular shoulder 43 adapted to abut arms 20 to prevent axial separation of the handle 14 and the closure 12.

As can be seen in FIG. 2, each tab 40 has a predetermined width and a pair of end walls 44 and 46. The cylindrical member 32 has an outer wall 48 on which is formed a plurality of protruding surfaces 50 which are spaced apart a predetermined dimension which is slightly greater than the width of tab 40. In the preferred embodiment, there is a a space formed on wall 48 intermediate surfaces 50 to accommodate each tab 40 formed on the skirt 16.

As can be seen in FIG. 2, the tab 40 is engaged between adjacent protruding surfaces 50 such that the end walls 44 and 46 engage shoulders 52 and 54, respectively, which shoulders 52 and 54 are formed between the surface 48 and protruding surfaces 50. Thus, it will be appreciated that the skirt 16 will not rotate relative to the handle 14 due to the engagement between tab 40 and the protruding surfaces 50. Thus, should the operator inadvertently grip the outer surface of skirt 16 when desiring to remove or install the fuel cap, relative rotation between the skirt 16 and handle 14 will not be permitted and the fuel cap can be removed or installed quite simply. It should also be appreciated that, during assembly of the cap, protruding surfaces 50 do not have to be aligned with surface 48. When the cap is installed in a fuel tank, initial operation by the operator will cause slight relative rotation to occur so that proper alignment will be achieved.

Obviously, many modifications and variations of the present invention are possible in light of the above teaching. It is therefore to be understood, that within the scope of the appended claim, the invention may be practiced otherwise than as specifically described.

The embodiments of the invention in which an exclusive property or privilege is claimed are defined as follows:

1. A fuel cap comprising; a handle member having an axially extending wall portion with a radially extending axially facing locking surface adjacent the distal end thereof, a cover portion, and a plurality of spaced radially extending protuberances on said wall portion extending between said radially extending locking surface and said cover portion; closure means operatively rotatably connected with said handle; and a skirt member having a plurality of spaced locking tabs each having a radially extending face abutting said locking surface on said handle member, shoulder means for preventing axial separation of said closure means relative to said handle member, and said spaced locking tabs each having a circumferential dimension substantially equal to said space between said spaced protuberances and each locking tab having radially extending end walls axially aligned to radially mate with the radial extent of said spaced protuberances whereby relative rotation between said handle and skirt is limited.

* * * * *